United States Patent [19]
Park et al.

[11] Patent Number: 5,855,815
[45] Date of Patent: Jan. 5, 1999

[54] PROCESS FOR PRODUCING A SYNTHESIS GAS FROM CARBON DIOXIDE

[75] Inventors: Sang-Eon Park; Jong-San Chang; Kyu-Wan Lee, all of Daejeon, Rep. of Korea

[73] Assignee: Korea Research Institute of Chemical Tech., Rep. of Korea

[21] Appl. No.: 601,025

[22] PCT Filed: Aug. 23, 1994

[86] PCT No.: PCT/KR94/00113

§ 371 Date: Apr. 29, 1996

§ 102(e) Date: Apr. 29, 1996

[87] PCT Pub. No.: WO95/06000

PCT Pub. Date: Mar. 2, 1995

[30] Foreign Application Priority Data

Aug. 25, 1993 [KR] Rep. of Korea .................. 1993-16885

[51] Int. Cl.$^6$ ...................................................... C07C 1/02
[52] U.S. Cl. ............................................................ 252/373
[58] Field of Search ............................ 252/373; 502/325, 502/326

[56] References Cited

U.S. PATENT DOCUMENTS 3,945,944  3/1976  Kang .

*Primary Examiner*—Michael L. Shippen
*Attorney, Agent, or Firm*—Vorys, Sater, Seymour & Pease, LLP

[57] ABSTRACT

A process for producing a synthesis gas having carbon monoxide and hydrogen from the reduction of carbon dioxide with natural gas or lower hydrocarbons having methane as a main component and oxygen and steam over catalyst composed of nickel and, as promotors, alkali metal and alkaline earth metal component supported on silicon-containing support such as zeolite, silica, silicate and silica-alumina which are stable under reaction condition is disclosed. This process characterized in that the catalytic activity and performance property are improved by supporting alkali metal, alkaline earth metal and nickel oxide from metal salts having low melting point uniformly on silicon-containing support having high surface area by solid-state reaction. The amounts of adding alkali metal, alkaline earth metal and nickel are 0.01 to 10% by weight, 1 to 20% by weight and 1 to 20% by weight, respectively. The present invention is conducted in the temperature range from 600° C. to 1000 ° C., and under a pressure of normal pressure to 20 atm, and gas hourly space velocity of 1,000 to 500,000/ hour.

20 Claims, No Drawings

PROCESS FOR PRODUCING A SYNTHESIS GAS FROM CARBON DIOXIDE

TECHNICAL FIELD

The present invention relates to a process for producing a synthesis gas from hydrocarbon and carbon dioxide. More specifically, the present invention relates to a process for producing a synthesis gas having high content of carbon monoxide by selective reaction of carbon dioxide with hydrocarbon, typically with methane which is a representative major component of natural gases in the presence of catalyst composed of alkali metals and alkaline earth metals together with nickel metal supported on silicon-containing support such as zeolite, silica, silicate and silica-alumina which are especially stable under reaction condition.

BACKGROUND ART

A steam reforming process utilizing catalysts, which produce a mixture of hydrogen and carbon monoxide, so called a synthesis gas, by using steam as an oxidant for methane which is a major component of natural gas has been already developed and industrialized. The synthesis gas made by the steam reforming of methane is applicable to Fischer-Tropsch synthesis which is a process for synthesizing ammonia and hydrocarbon, and to a process for producing oxygen-containing compound like methanol. However, this steam reforming process to give a synthesis gas has problems that the molar ratio of hydrogen to carbon monoxide in obtained synthesis gas mixture is restricted to 3:1 or more. Thus it is difficult to apply the process to raw material for oxygen-containing compound and Fischer-Tropsch synthesis due to the small content of carbon monoxide. Therefore, a synthesis gas having high content of carbon monoxide which can be applicable variously not only to Fischer-Tropsch synthesis but also to hydroformylation and carbonylation is highly demanded. Another problem of steam reforming is the deactivation of the catalyst due to coke formation from methane at high temperature. In particular, it is known that deactivation of catalyst due to coke formation is severe in case of nickel catalyst which is representative steam reforming catalyst. Accordingly, in order to inhibit the coke formation owing to methane, steam and methane as reactant gases have been used in a molar ratio of 4:1 or more in practical processes, but an excessive steam can also cause deactivation of catalyst since it accelerates sintering of metals which are active component of the catalyst.

Recently, technologies to control the amount of carbon dioxide to meet a worldwide movement to control total amount of carbon dioxide have been studied in many ways in order to prevent the global warming owing to green house effect wherein carbon dioxide is pointed out as its main suspicious component.

In case of producing a synthesis gas by replacing steam with carbon dioxide in the reforming reaction of methane, a ratio of hydrogen to carbon monoxide in the reforming reaction using carbon dioxide is low as compared with that of the steam reforming reaction and this ratio can be controlled within wide range from 0.5:1 to 2:1 when a molar ratio of carbon dioxide to methane is changed. However, this process can cause catalyst deactivation due to severe coke formation on catalyst surface as in the steam reforming.

To alleviate the problem of coke formation, U.S. Pat. No. 5,068,057 suggested use of noble metal catalysts. In the specification, it was reported that in case of using commercially available Ni catalyst as steam reforming catalyst in converting carbon dioxide into carbon monoxide, the conversion reaction was ceased in less than two hours because the blockage of reactor tube was occurred due to both accumulation of coke and degradation of catalyst structure. Moreover, Pt/alumina and Pd/alumina catalysts were suggested as active catalysts in the conversion reaction of carbon dioxide into carbon monoxide using hydrocarbon.

International laying-open WO 92 11,199 (1992) disclosed that alumina supported noble metal catalysts such as iridium, rhodium and ruthenium had high activity and long life. But the above noble metal catalysts had a problem of high price.

OBJECTS OF THE INVENTION

It is an object of the invention to provide a process for producing a synthesis gas having low ratio of hydrogen to carbon monoxide from carbon dioxide and hydrocarbon by using inexpensive Ni catalyst.

Other objects and advantages will be apparent to those of ordinary skill in the art from the following descriptions.

DISCLOSURE OF THE INVENTION

The present invention relates to a process for producing a synthesis gas from hydrocarbon and carbon dioxide.

The synthesis gas having carbon monoxide to hydrogen in a ratio from 1:2 to 2:1 can be produced by reduction of carbon dioxide continuously with natural gas or lower hydrocarbons having methane as a main component and a small amount of oxygen and steam, in a molar ratio of 0.2:1 to 5:1 over a catalyst composed of nickel and, as promoters, alkali metal and alkaline earth metal component supported uniformly on silicon-containing support having high surface area, such as zeolite, silica, silicate and silica-alumina at reaction temperature of 600° C. to 1000° C., reaction pressure of 0.5 atm to 20 atm, and gas hourly space velocity of 1,000 to 500,000/hour. In the above process, it is preferable that reaction temperature is in a range of 700° C. to 900° C., reaction pressure is in a range of 1 to 10 atm and gas hourly space velocity is in a range of 5,000 to 100,000/hour.

The reforming reaction of methane using carbon dioxide according to the present invention is not affected greatly by reaction pressure and the pressure can be controlled from below 1 atm to 20 atm. However, the practical reaction pressure is determined by desired equilibrium conversion, reactor materials and selection of equipments. The effect of reaction pressure on the reforming reaction is that equilibrium conversion decreases as the pressure increases, and equilibrium conversion increases as the pressure decreases. The pressure in the present invention is used in a range of 0.5 atm to 20 atm. The pressure of 1 atm to 10 atm is suitable for practical use.

One of characteristics and advantages of the present invention is that separation problems of synthesis gas can be alleviated since water is not produced at high temperature more than 750° C. except synthesis gas. The activity of the catalyst of the present invention is maintained continuously without decreasing the activity of the catalyst even though oxygen or steam may be contained in the reactant gases used in the present invention since coke in question generated on catalyst surface can be removed by oxidizing it into carbon monoxide and carbon dioxide. Accordingly, the present invention is directed to a process for converting carbon dioxide which causes global warming and has enormous effects on environmental problem into valuable synthesis gas, and is therefore very significant as a technology of reducing carbon dioxide using hydrocarbons over catalyst.

BEST MODE FOR CONDUCTING THE INVENTION

Now, the present invention will be described more specifically with reference to examples hereinafter, however it should be noted that the present invention is not intended to be restricted within those specific examples.

EXAMPLE 1

In this example, K—Ni—Ca/pentasil-type zeolite catalyst was prepared by the following method.

Pentasil-type ZSM-5 zeolite having high surface area (surface area: 340 m² /g) was mixed with nitrates of nickel (m.p:56.7° C.) calcium(m.p:39.7° C.) and potassium(m.p: 370° C.) having low melting point as a precursor of metal component. All the nitrate was melted by heating from room temperature to 400° C. as a rate of 2° C. per minute increase under the stream of argon, the nitrate was decomposed at 400° C. for four hours and then the nitrate was supported on zeolite as an oxide by heat treatment at 650° C. for four hours.

To ¼ inch quartz reactor was added the K—Ni—Ca/ pentasil-type zeolite (molar ratio of K:Ni:Ca=0.08:1.0:2.2, Ni content: 5.4% by weight) prepared above, after reduction with 5% hydrogen at 700° C. for one hour, then the reactant mixture was reacted over the catalyst at 700° C. under normal pressure, gas hourly space velocity of 74,000/hour by setting the partial pressure of carbon dioxide to 0.25 atm and the molar ratio of carbon dioxide to methane to 1:1. The conversions(%) of carbon dioxide and methane and the yields(%) of carbon monoxide and hydrogen measured under the above mentioned reaction condition are summarized in Table 1. The yield of carbon monoxide listed in Table 1 was expressed in percentage of the partial pressure of carbon monoxide produced by the reaction based on total partial pressures of initial carbon dioxide and methane supplied before the reaction, and the yield of hydrogen was expressed in percentage of the partial pressure of hydrogen based on twice of partial pressure of methane before the reaction.

Comparative Example 1

The procedure described in Example 1 was repeated except that Ni/pentasil-type zeolite (Ni content=5.4% by weight) was used as a catalyst under the same reaction conditions as those employed in Example 1. The reaction results are summarized in Table 1.

Comparative Example 2

The procedure described in Example 1 was repeated except that Ni/α-alumina(Ni content: 5.4% by weight) was used as a catalyst under the same reaction conditions as those employed in Example 1. The results of the reaction are summarized in Table 1.

Under the same condition of 700° C., Ni/α-alumina catalyst showed relatively low conversion(%) and yield less than 50% at high space velocity of 74,000/hour, while Ni/pentasil-type zeolite catalyst showed about 20% or more improved conversions and yields as compared to Ni/α-alumina. In addition, when K and Ca were added to Ni, conversions and yields were improved about 10% or more as compared to Ni/pentasil-type zeolite catalyst. By comparing the results on catalytic activity at the same conditions shown in Table 1, it was seen that K—Ni—Ca/pentasil-type zeolite and Ni/pentasil-type zeolite catalysts were more effective in converting carbon dioxide and methane into a synthesis gas consisting of carbon monoxide and hydrogen and the ratio of carbon monoxide to hydrogen was almost 1:1.

EXAMPLE 2

The procedure described in Example 1 was repeated except that temperature and space velocity were changed, but the same catalyst as in Example 1 was used under the same reaction condition. The reaction was carried out by changing the reaction temperature from 550° C. to 800° C. at intervals of 50° C. The results are summarized in Table 2.

As seen from Table 2, the conversions and yields(%) at a temperature of above 700° C. were close to equilibrium conversions and equilibrium yields on calculation, while the conversions of carbon dioxide and methane and the yields of carbon monoxide and hydrogen were as high as 90% or more at 800° C.

EXAMPLE 3

The procedure described in Example 1 was repeated under the same condition except that reaction temperature was set to 800° C. and space velocity was set to 44,000/hour, and initial reaction activity and reaction activity after 100 hours were compared. The conversions of carbon dioxide and methane at early reaction were 93%, which were constantly maintained within 3% of error range after 100 hours, and coke formation was not observed.

EXAMPLE 4

The procedure described in Example 1 was repeated under the same condition except that space velocity was set to 22,000/hour and the molar ratio of carbon dioxide to methane was changed to 0.24:1, 0.53:1, 1:1 and 2.06:1, respectively. The results are summarized in Table 4. The conversion of methane increased as the ratio of carbon dioxide to methane increased, and the conversion showed nearly 100% when the ratio was above 3. On the other hand, the conversion of carbon dioxide increased as the ratio of carbon dioxide to methane decreased, and the conversion was nearly 90% or more when the ratio was below 0.3. The ratio of carbon monoxide/hydrogen increased gradually from 0.62 to 1.50 as the ratio of carbon dioxide/methane increased from 0.24 to 3.44. In the reforming reaction of methane using carbon dioxide, a synthesis gas having various component ratio in a range of 0.5 to 2.0 was obtained as the reactant ratio of carbon dioxide to methane was changed.

EXAMPLE 5

The procedure described in Example 1 was repeated under the same condition except that reaction temperature was set to 700° C. and 800° C., respectively and space velocity was changed. The results are summarized in Table 3. The conversion was 78% at 700° C. and space velocity of less than 44,000/hour, and 93% at 800° C. and space velocity of less than 100,000/hour, which coincided with equilibrium conversion.

EXAMPLE 6

The procedure described in Example 1 was repeated under the same condition except that space velocity was set to 44,000/hour and reaction temperature was changed to 650° C., 700° C. and 750° C., respectively, by increasing at intervals of 50° C. The reaction result in case of adding oxygen to reactant gases in a ratio of 1:10 and the result in case of not adding oxygen were summarized in Table 5. The activity of the catalyst was maintained without any decreasing even in the presence of oxygen. In the presence of oxygen, the conversion of methane increased a little, the conversion of carbon dioxide decreased a little and the yield of hydrogen increased as compared to the case in the absence of oxygen. Moreover, the ratio of hydrogen to carbon monoxide was higher when oxygen was present.

EXAMPLE 7

The procedure described in Example 1 was repeated under the same condition except that reaction temperature was changed to 600° C., 700° C. and 800° C., respectively, by increasing at intervals of 100° C. The reaction result in case of adding steam into reactant gases in a steam/methane ratio of 1/10 and the result in case of not adding it were summarized in Table 6. Space velocity was set to 22,000/hour at 600° C. and 700° C., and 74,000/hour at 800° C. The catalytic activity was maintained in the presence of steam. The catalytic activity in case of adding steam was generally similar to that of not adding steam. However, the hydrogen yield at 700° C. increased considerably as compared with that of carbon monoxide. This result seems to be attributed to contribution of steam to steam reforming reaction under that reaction condition.

As seen from Table 5, the fact that high catalytic activity is maintained in the presence of oxygen has advantages in that the presence of oxygen does not cause deactivation of the catalyst since coke formation on catalyst surface can be removed in a form of carbon monoxide and carbon dioxide and catalyst life can be lengthened thereby. In addition, the purity of the reactants consisting of carbon dioxide and methane is not necessarily high.

As seen from Table 6, high catalytic activity is maintained when steam is added, and this has advantages in that the dehydration process of reactants can be alleviated since the reaction activity does not decrease even if a portion of moisture is incorporated in the reactants. Further, the reforming reaction of methane using carbon dioxide proceeds together with the steam reforming reaction, and thereby hydrogen/carbon monoxide ratio can be controlled.

TABLE 1

| Ex. No. | Catalyst | Conversion (%) | | Yield (%) | |
|---|---|---|---|---|---|
| | | $CO_2$ | $CH_4$ | CO | $H_2$ |
| Ex. 1 | K-Ni-Ca/pentasil-type zeolite | 76 | 74 | 75 | 76 |
| Comp. Ex. 1 | Ni/penatasil-type zeolite | 61 | 61 | 62 | 63 |
| Comp. Ex. 2 | Ni/α-Alumimna | 40 | 38 | 41 | 42 |

TABLE 2

| Temperature | Conversion(%) | | Yield (%) | |
|---|---|---|---|---|
| (°C.) | $CO_2$ | $CH_4$ | CO | $H_2$ |
| 550 | 16 | 13 | 15 | 15 |
| 600 | 33 | 30 | 28 | 30 |
| 650 | 51 | 47 | 43 | 47 |
| 700 | 74 | 76 | 75 | 76 |
| 750 | 82 | 81 | 81 | 83 |
| 800 | 93 | 93 | 93 | 94 |

TABLE 3

| $CO_2/CH_4$ | Conversion(%) | | Yield (%) | |
|---|---|---|---|---|
| (molar ratio) | $CO_2$ | $CH_4$ | CO | $H_2$ |
| 0.24 | 92 | 21 | 34 | 21 |
| 0.53 | 81 | 45 | 58 | 43 |
| 1.0 | 78 | 79 | 78 | 79 |
| 2.06 | 53 | 96 | 67 | 76 |
| 3.44 | 34 | 99 | 50 | 75 |

TABLE 4

| Reaction Temperature (°C.) | Space Velocity (× 1000/hour) | $CO_2$ Conversion (%) |
|---|---|---|
| 700 | 22 | 79 |
| 700 | 44 | 78 |
| 700 | 74 | 76 |
| 700 | 180 | 69 |
| 700 | 300 | 50 |
| 800 | 22 | 93 |
| 800 | 44 | 93 |
| 800 | 74 | 93 |
| 800 | 180 | 89 |
| 800 | 300 | 81 |

TABLE 5

| Reaction Temperature | Oxygen | Conversion (%) | | Yield (%) | |
|---|---|---|---|---|---|
| (°C.) | addition | $CO_2$ | $CH_4$ | CO | $H_2$ |
| 650 | No | 55 | 47 | 53 | 53 |
| 650 | Yes | 47 | 55 | 53 | 56 |
| 700 | No | 78 | 78 | 78 | 79 |
| 700 | Yes | 66 | 80 | 74 | 80 |
| 750 | No | 86 | 86 | 85 | 86 |
| 750 | Yes | 78 | 89 | 89 | 92 |

TABLE 6

| Reaction Temperature | Steam | Conversion (%) | | Yield (%) | |
|---|---|---|---|---|---|
| (°C.) | addition | $CO_2$ | $CH_4$ | CO | $H_2$ |
| 600 | No | 46 | 44 | 44 | 40 |
| 600 | Yes | 47 | 46 | 44 | 46 |
| 700 | No | 78 | 79 | 78 | 79 |
| 700 | Yes | 79 | 76 | 74 | 82 |
| 800 | No | 93 | 93 | 93 | 94 |
| 800 | Yes | 88 | 93 | 90 | 92 |

We claim:

1. A process for producing a synthesis gas having carbon monoxide/hydrogen in a ratio of from 1/3 to 3/1, which comprises reacting carbon dioxide with natural gas or lower hydrocarbon having methane as a main component, from 0 to 10 vol % of oxygen and 0 to 10 vol. % of steam, in a molar ratio of 0.2:1 to 5:1 over catalyst composed of nickel and, as promoters, alkali metal and alkaline earth metal component supported uniformly on silicon-containing support at reaction temperature of 600° C. to 1000° C., reaction pressure of 0.5 atm to 20 atm, and space velocity of 1,000 to 500,000 per hour.

2. A process for producing a synthesis gas according to claim 1 in which silicon-containing support is zeolite, silica, silicate or silica-alumina.

3. A process for producing a synthesis gas according to claim 1 in which the active metal component of the catalyst is nickel.

4. A process for producing a synthesis gas according to claim 1 in which the alkali metal component of the catalyst is K, Na or Cs.

5. A process for producing a synthesis gas according to claim 1 in which the nickel content of the catalyst is in a range of 1 to 20% by weight.

6. A process for producing a synthesis gas according to claim 1 in which the alkali metal content of the catalyst is in a range of 0.01 to 10% by weight.

7. A process for producing a synthesis gas according to claim 1 in which the alkaline earth metal content of the catalyst is in a range of 0.1 to 20% by weight.

8. A process for producing a synthesis gas according to claim 1 in which the molar ratio of methane to carbon dioxide as reaction gases is 0.2:1 to 5:1.

9. A process for producing a synthesis gas according to claim 1 in which the reaction temperature is in a range of 700° C. to 900° C.

10. A process for producing a synthesis gas according to claim 1 in which the reaction pressure is in a range of 1 to 10 atm.

11. A process for producing a synthesis gas according to claim 1 in which the space velocity is in a range of 1,000 to 100,000/hour.

12. A process for producing a synthesis gas according to claim 1 in which the alkaline earth metal component of the catalyst is Ca, Mg, Sr or Ba.

13. The process of claim 1 wherein substantially no molecular oxygen is present in the reaction mixture.

14. The process of claim 1 wherein substantially no steam is present in the reaction mixture.

15. The process of claim 1 wherein substantially no molecular oxygen and substantially no steam are present in the reaction mixture.

16. The process of claim 2 wherein said silicon containing support is a zeolite.

17. The process of claim 2 wherein said silicon containing support is a pentasil zeolite.

18. The process of claim 17 wherein said catalyst has a surface area of about 300 square meters per gram to about 600 square meters per gram.

19. The process of claim 17 wherein said catalyst has a surface area of about 340 square meters per gram.

20. The process of claim 17 wherein said catalyst has a surface area of 340 square meters per gram.

* * * * *